Dec. 15, 1925.
G. A. FLEBOTTE
1,565,919
LOADING APPARATUS
Filed Sept. 27, 1924
3 Sheets-Sheet 1
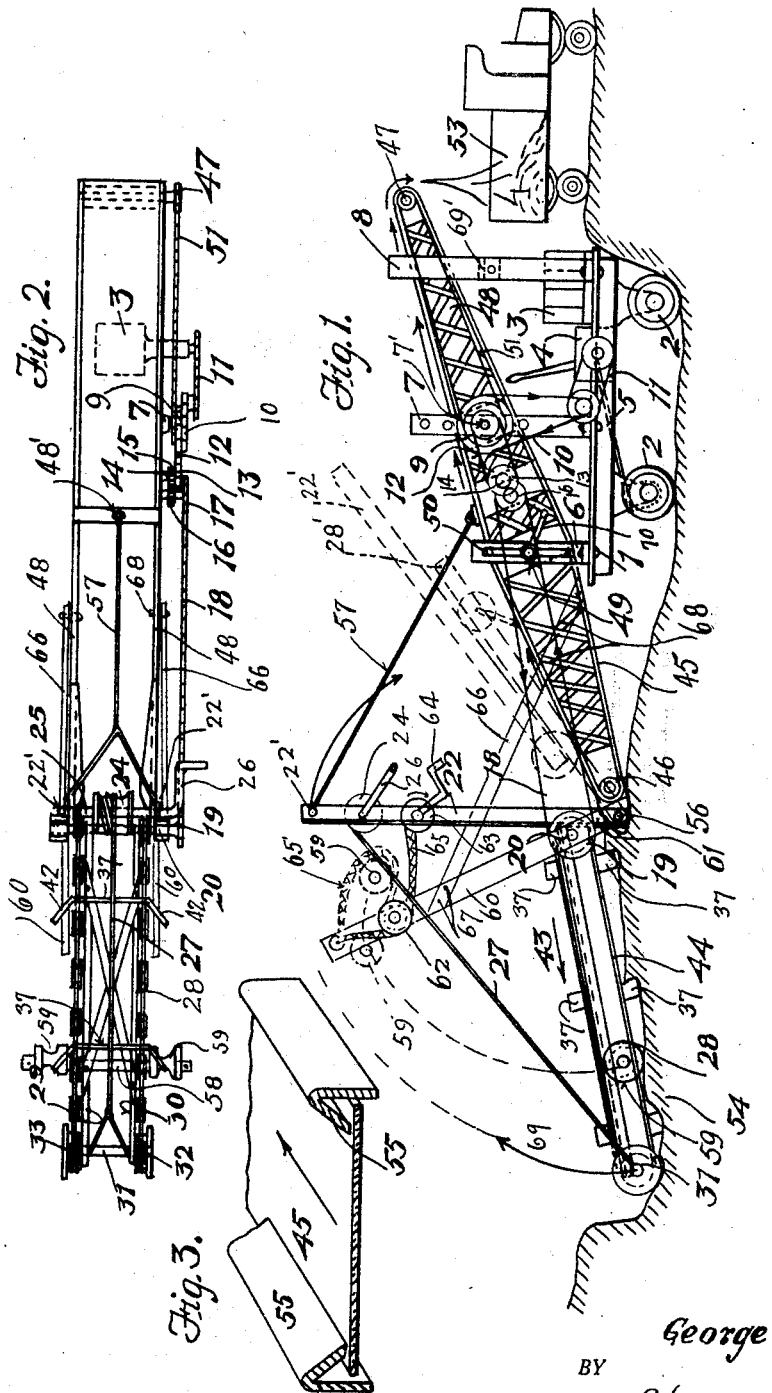
INVENTOR.
George A. Flebotte.
BY
Harry W. Bowen.
ATTORNEY.

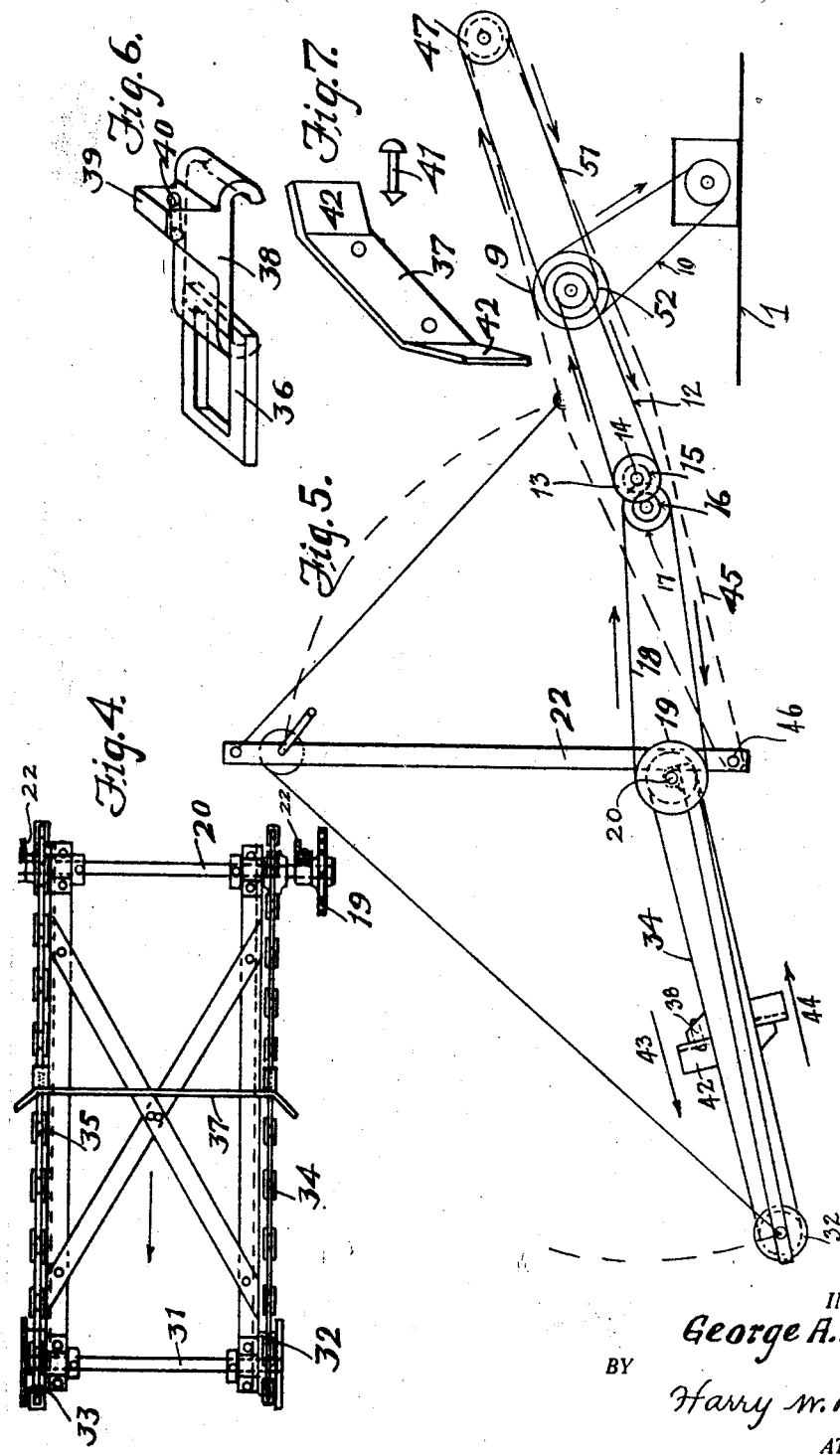

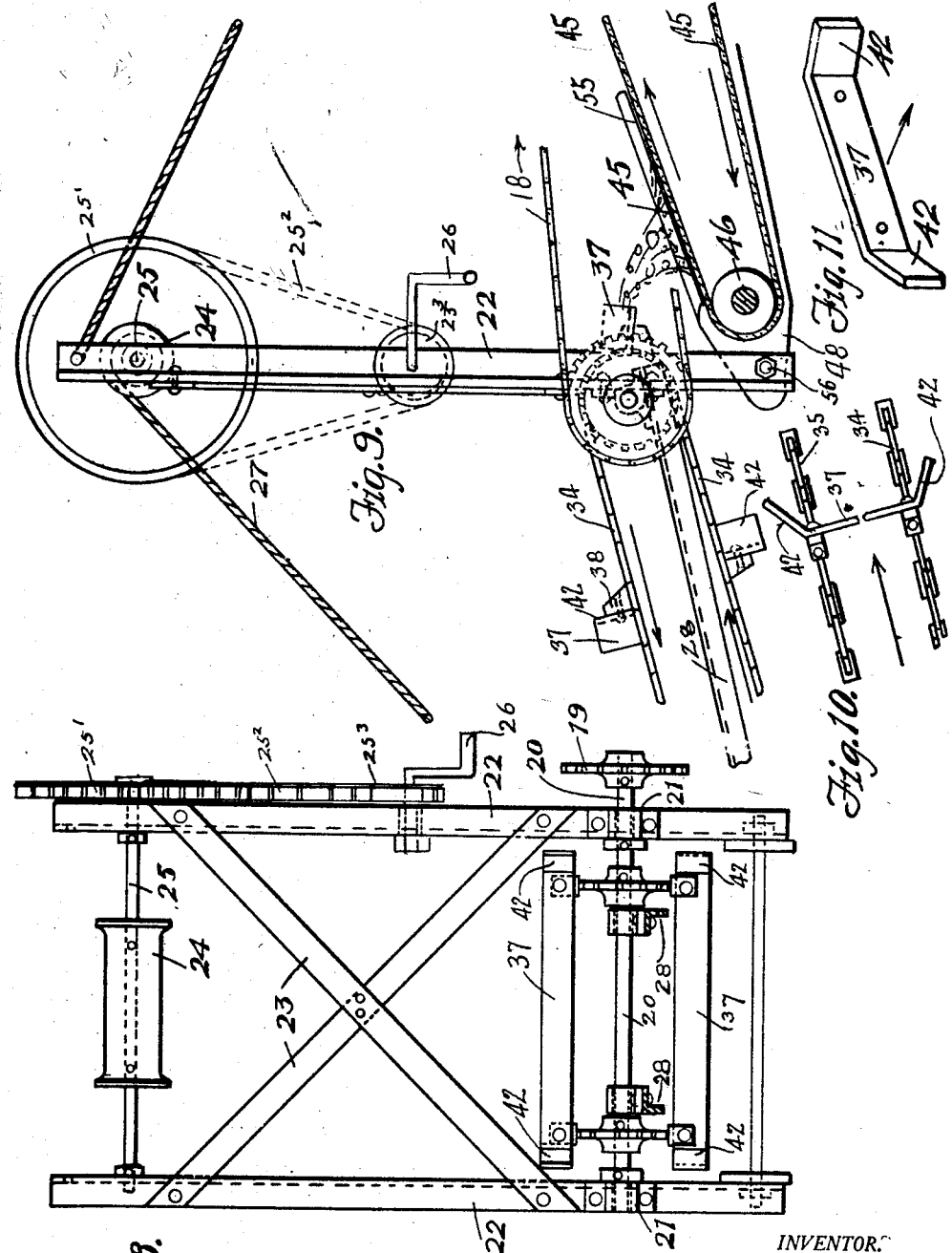

Patented Dec. 15, 1925.

1,565,919

UNITED STATES PATENT OFFICE.

GEORGE A. FLEBOTTE, OF INDIAN ORCHARD, MASSACHUSETTS.

LOADING APPARATUS.

Application filed September 27, 1924. Serial No. 740,393.

*To all whom it may concern:*

Be it known that I, GEORGE A. FLEBOTTE, a citizen of the United States, residing at Indian Orchard, in the county of Hampden and State of Massachusetts, have invented new and useful Improvements in Loading Apparatus, of which the following is a specification.

This invention relates to improvements in loading apparatus for excavating purposes, as removing soil from road-ways, cellars and conveying the removed material into a truck for drawing the removed material away for grading or other purposes.

The invention, broadly, comprises an endless travelling conveyor member which is provided with soil engaging scrapers that will collect the soil and carry it upward onto a second endless travelling conveyor which, will in turn, convey it to the receiving receptacle or truck. The motive power for operating these conveyors is mounted on a separate trailer or platform having a suitable motor, as a gasolene motor, which is belted to a train of gearing for operating the conveyor chains. Suitable devices are provided for folding the different members of the conveying apparatus into a compact position so that the platform trailer may be conveniently moved from one place to another for use. Other devices are further provided for varying the vertical elevational position of the endless conveyors which operate on the embankment or cellar for removing the earth material.

Referring to the drawings:

Fig. 1 is a side elevational view of the complete apparatus showing it as used for excavating purposes and illustrating in dotted lines the method of folding one portion onto the other in order that it may be moved from place to place by the supporting trailer.

Fig. 2 is a plan view of Fig. 1 illustrating the scraper bars attached to the endless chain conveyor, also the windlass construction for raising and lowering the scraper bars.

Fig. 3 is a detail view of a portion of the conveyor belt which receives the earth material that is carried upward by the scraper bars and delivered onto this endless conveyor.

Fig. 4 is an enlarged detail view of the endless sprocket chains to which the scraper bars are attached and illustrating the means for operating the sprocket chains.

Fig. 5 is an enlarged diagrammatic view of the operative portions of the loading apparatus illustrating the manner of connecting the motive power to the different operative members of the apparatus.

Fig. 6 is a detail view of two of the links of the sprocket chain, one of the links having a part for attaching the scraper bars to the chain.

Fig. 7 is a detail view of one of the scraper bars removed from the chain.

Fig. 8 is an enlarged detail view of the windlass apparatus for raising and lowering the member which carries the sprocket chains to which the scraper plates are secured.

Fig. 9 is an enlarged detail view in elevation, showing the windlass construction and the relative positions of the endless sprocket chain and scraper plates which are attached to the same and delivers the earth material onto the belt conveyor which, in turn, delivers the material into a truck or other receiving apparatus.

Fig. 10 is a detail view of one of the scraper bars shown attached to two of the links of the endless sprocket chain, and Fig. 11 is a detail perspective view of one of the scraper bars showing an arrow to indicate the direction that the bar and its chain moves.

Referring to the drawings in detail:

1 designates a wheel mounted platform for supporting the loading apparatus. It is mounted on supporting wheels 2 and designed to be propelled by means of the motor indicated at 3 which motor is connected through the gear box 4 to the usual propellor shaft 5. Secured on the platform 1 are three uprights indicated at 6, 7, and 8. Mounted in the up-right 7 is a sprocket wheel 9 that is driven from the motor 3 by means of the sprocket chains 10 and 11. 12 designates a sprocket chain which connects the shaft of the sprocket wheel 9 to the sprocket wheel 13 which latter wheel drives the shaft 14 that carries a gear wheel 15 that meshes with the second gear wheel 16. The gear wheels 15 and 16 being of the same diameter will cause the rate of rotation of the gear wheel 16 to be equal to the rate of rotation of the gear 15. The gear 16 drives the sprocket wheel 17 over which passes a sprocket chain 18. This chain engages a sprocket wheel 19 that is mounted on the transverse shaft 20. This shaft is supported in the bearing boxes 21 that are secured to the up-right side bars 22 which consist of angle iron. The upper ends of these bars are rigidly connected together by the cross members 23 and near the upper ends of the bars 22 is located the windlass 24 which is secured to the operating shaft 25, one end of which is provided with an operating handle 26. Passing around the windlass 24 is a rope 27, the lower end of which is attached to the outer ends of the frame work 28, which frame is made up of the bars 29 and 30. Rotatably mounted in the outer ends of the bars 29 and 30 is the shaft 31, on the opposite ends of which are secured the sprocket wheels 32 and 33 over which passes the sprocket chains 34 and 35. A detail of one of the links is shown in Fig. 6 indicated by the reference numeral 36 and a detail of one of the links which is connected to the link 36 and to which the scraper bars 37 are attached is indicated at 38 which link is formed with an upwardly extending part 39 having the opening 40. The scraper bars 37 are riveted or otherwise secured to the links 38 with the rivets 41. These bars are formed with the angular shaped ends 42, as shown in Fig. 7. The spocket chains 34 and 35 with the earth scraper bars 37 attached thereto travel in the direction of the arrows indicated at 43 and 44. The inner or discharge ends for the scraper bars is arranged over the endless conveyor belt 45 shown in the enlarged view in Fig. 9. This belt conveyor passes over the pulley 46 at one end and over a pulley 47 at its inner end. These two pulleys are rotatably mounted in the latticed frame work 48, (see Fig. 1), which frame work is pivotally mounted in the up-right 6 and may be clamped in different vertical positions by means of the device indicated at 49. The up-right 6 as shown is formed with a slot 50 for varying the vertical position of the frame work 48. 51 is a driving belt for the belt conveyor 45 which passes over the pulley 52 which is secured to the same shaft as the sprocket wheel 9. This belt passes around a pulley 47 which is mounted on the same shaft as the pulley 47 over which passes the endless belt conveyor 45. A detail of this endless conveyor is shown in Fig. 3. 55 are side strips to confine the material being conveyed to the truck. The delivery end of the conveyor 45 is located over the receiving truck 53 as indicated in Fig. 1. The scraper bars 37 will engage the earth material indicated at 54 and in turn will carry a portion of the removed material and deliver it directly onto the endless traveling conveyor 45 which discharges it into the truck 53 as shown. The sides of the conveyor 45 are provided with metal plates 55 (see Fig. 3) to confine the material in the center portion of the same to prevent its working over the side edges thereof. The latticed frame work 48 has pivoted at its lower end the two up-right bars 22, indicated at 56. Attached at 22' to the upper end of the up-right frame work 22 is a supporting cable 57, the other end of which cable is attached to the frame work 48 at 48'. Extending across the side bars of the frame 28 is a rod 58. On the outer ends of this rod is placed the grooved pulleys 59. Secured to the lower ends of the up-rights 22 are the two bars 60 as indicated at 61. Located on these bars are the pulleys 62. Also located on the up-rights 22 are the winding drums 63 which are operated by the cranks 64. Attached to the upper ends of the bars 60 are cables 65 which pass around under the pulleys 62 to the winding drums 63. In order to properly support the bars 60 braces 66 are provided which are secured to the bars 60 by rivets 67 and to the frame 48 by rivets 68.

When it is desired to fold the apparatus for transportation; the operator elevates the frame 28 by rotating the winding drum 24. This operation turns the frame 28 on its pivotal connection at 20. The arrow 69 indicates the path of its upward movement. A continued rotation of the windlass or drum 24 brings the pulleys 59 on the frame 28 against the cables 65 causing them to assume the looped position indicated by the dotted line of these cables at 65'. The frame 28 is now hooked up or supported in this upright position by these cables. The next operation is to fold the up-rights 22, and frame 28 onto the latticed frame 48 as indicated by the dotted line positions 22'' and 28' and about the pivotal center 56. Next the operator folds or tilts the frames 48, 28 and 22 as a unit about its pivotal support 7' in the up-right 7. 69' indicates a support or rest for this unit at its forward end on the up-right 8. The whole is now secured in place by the tightening nut 49 with the arm 70. In order to unfold the apparatus the operations are of course reversed. The winding of the cables 65 which supports the frame 28 in an upward position onto the drums 63 will shorten the same and cause the pulleys 59 to operate to force the frame 28 to return to its original position. The cable 27 is now unwound from the drum 24 permitting the frame 28 to be lowered ready for operation again. The frame 28 is raised and lowered by operating the drum 24 so that it may be adjusted and held properly in working position.

What I claim is:

1. An exacavating and loading apparatus comprising, in combination, a supporting platform, motive power thereon, an endless material receiving and delivery conveyor, a frame pivotally supported on the platform for supporting the said conveyor, a pair of up-rights pivotally and directly attached to one end of said frame, an endless chain supporting frame which is pivotally attached to the pair of up-rights, a windlass secured to the pair of up-rights for raising and lowering the said chain supporting frame, scraper blades secured to the endless chain for transferring the scraped material directly onto the said endless conveyor, and means for operating the said endless conveyor and chain from the motive power on the platform.

2. An excavating and loading apparatus comprising in combination, a wheel supported platform, motive power thereon, an endless material receiving and delivery conveyor, a tiltable frame for supporting said conveyor, means comprising slotted uprights on the platform for securing the tiltable frame in different vertical positions, upright bars pivotally secured to the outer lower end of said tiltable frame, an endless material scraping chain supporting frame pivotally and directly attached to the pivotally attached upright bars, means on the pivotally attached upright bars, for raising and lowering the said chain supporting frame into contact with the material to be excavated and loaded, cable means for supporting the chain supporting frame on the pivotally attached upright bars, scraper bars on the said chain, the construction and arrangement being such that the material carried along by the scrapers is delivered onto the said endless conveyor for delivery into a receiving receptacle, and means for operating the conveyor and chains from the motive power.

3. In an excavating and loading apparatus, the combination, of wheeled supported platform, a frame member pivotally mounted on the platform, two endless chains mounted on the frame member, means for operating the chains, scrapers attached to one of the endless chains for engaging the material to be removed, a frame for supporting one of the endless chains, uprights on the platform to which the frame member is pivotally connected, up-rights pivotally attached to the frame member, means for supporting the latter up-rights in a vertical position, a winding drum on the latter up-rights, a cable connected to the said drum and chain supported frame member for raising and lowering the said frame member relative to the material to be excavated, means for hooking up or supporting the said frame member on the up-rights consisting of cables attached to the up-rights, a winding drum for the cables and pulleys on the said frame member for engaging the cables, when they are in a slack position.

4. A combined excavating and loading apparatus comprising a wheel supported platform, motor means for moving the same from place to place, three up-rights secured to the platform, one of the up-rights being slotted, a frame pivotally supported on one of the up-rights, means on the slotted up-right for retaining the said frame in different vertical tilted positions about its support, and the remaining up-right cooperating to support the said frame when not in use.

5. A combined excavating and loading apparatus comprising a wheel supported platform, motor means for moving the same from place to place, the rigid up-rights secured to the platform, a frame pivotally supported on one of the up-rights, means comprising a slot and bolt on another of the up-rights for retaining the said frame in different tilted positions about its support, the remaining up-right cooperating to support the said frame when not in use, a traveling endless discharging conveyor on the pivotally supported frame, endless traveling chains, scrapers secured to the chains, a pivotally supported frame work for supporting the same, and pivotally connected to the said pivotally supported frame, gearing connecting means between the endless conveyor and said chains for moving the same in opposite directions, and connecting means from the motive power to said connecting means.

6. A combined excavating and loading apparatus comprising a wheel supported platform, motor means for moving the same from place to place, a plurality of rigid up-rights secured to the platform, a frame pivotally supported on one of the up-rights, slot and bolt means on another of the up-rights, for retaining the said frame in different tilted positions about its support, the remaining pair of up-rights cooperating to support the said frame when not in use, a traveling endless material delivery conveyor on the frame, endless traveling chains, scrapers secured to the chains, a frame work for supporting the traveling conveyor, and pivotally connected to the said pivotally supported frame, connecting means between the endless material conveyor and said chains for moving the same in opposite directions, and connecting means from the motive power to said connecting means, and the discharge end of the scraper chains being located over the receiving end of the endless traveling conveyor.

7. In combination in an excavating and loading machine, a motor driven platform, a tiltable frame thereon, up-right bars pivotally connected to said frame, a frame pivotally connected to the up-right bars, cable means for supporting the bars in an up-right position, windlass means on the bars for raising and lowering the frame which is pivoted thereto, an endless travelling chain on the pivotally connected frame, scrapers on the chain, an endless conveyor on the tiltable frame, connecting means between the chains and the endless conveyor, and connecting means between the motor on the platform and the said connecting means, the construction and arrangement being such that the said up-right bars and pivotally connected frame may be folded onto the tiltable frame, and means for retaining the tiltable frame in a position with its forward end in lowered position for transportation purposes.

8. In combination, in an excavating and loading machine, a wheeled supported platform having motive power supported thereon, the platform having three rigid uprights secured thereto, one at each end and one substantially midway of its length, a frame pivotally supported at substantially its center on the upright between the two end ones, the upright at the rear end being slotted to receive a bolt device for retaining the pivotally supported frame in its operative or inoperative position, the upright at the front end having a part for supporting the pivotal frame in its inoperative position, as described.

9. In combination, in an excavating and loading machine, a wheeled supported platform having motive power supported thereon, the platform having three rigid uprights secured thereto, one at each end and one substantially midway of its length, a frame pivotally supported on the upright between the two end ones, the upright at the rear end being slotted to receive a bolt device for retaining the pivotally supported frame in its operative or inoperative position, the upright at the front end having a part for supporting the pivotal frame in its inoperative position material receiving and a discharge conveyor supported by the pivotally mounted frame, a shaft supported on the centrally disposed upright a sprocket wheel thereon, connecting means between the motive power and the sprocket wheel, two other sprocket wheels on the shaft, a sprocket wheel at the outer or front end of the pivotal frame for operating the receiving and discharge conveyor, and connecting means between the last mentioned sprocket wheel and one of the sprocket wheels on said shaft.

10. In combination, in an excavating and loading machine, a wheeled supported platform having motive power supported thereon, the platform having three rigid uprights secured thereto, one at each end and one substantially midway of its length, a frame pivotally supported on the upright between the two end ones, the upright at the rear end being slotted to receive a bolt device for retaining the pivotally supported frame in its operative or inoperative position, the upright at the front end having a part for supporting the pivotal frame in its inoperative position, a material receiving and discharge conveyor on the pivotally supported frame, connecting means between the motor and the said conveyor for operating the conveyor, gear wheels attached to the pivotally supported frame and meshing with each other, an endless scraper chain supporting frame pivotally attached to the pivotally supported frame, operative connecting means from one of the gears to the endless scraper chain for causing the endless chain to travel in the same direction as the discharge conveyor on the pivotally supported frame, and so arranged for directly delivering the scraped material onto the discharging conveyor.

11. In combination, in an excavating machine, a wheeled supported platform, motive power thereon, a frame pivotally supported thereon, a material receiving and discharge conveyor on the pivotally supported frame, a second conveyor frame pivotally connected at one end to the said frame, the second conveyor frame having endless chains secured thereto, material scrapers on the chains, means for operating the chains in the same direction as the said conveyor, an upright frame pivotally attached to the pivotally supported frame, a frame secured to the upright frame, pulleys on the second conveyor frame, flexible cables connecting the upright frame and the frame secured to the upright frame, means for raising the second conveyor frame and bringing the pulleys against the cables for supporting the conveyor frame, means for folding the upright frame and second conveyor frame onto the pivotally mounted frame and means for supporting the three frames in their folded positions.

GEORGE A. FLEBOTTE.